(12) United States Patent
Eikmeier et al.

(10) Patent No.: US 7,204,449 B2
(45) Date of Patent: Apr. 17, 2007

(54) COVER STRIP

(75) Inventors: Markus Eikmeier, Lensahn (DE);
Thomas Gassner, Heidgraben (DE);
Karl-Heinz Beusch, Tonisvorst (DE);
Bernhard Gebbeken, Hamburg (DE);
Christoph Nagel, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/490,809

(22) PCT Filed: Sep. 26, 2001

(86) PCT No.: PCT/EP01/11122

§ 371 (c)(1),
(2), (4) Date: Jan. 4, 2005

(87) PCT Pub. No.: WO03/029119

PCT Pub. Date: Apr. 10, 2003

(65) Prior Publication Data

US 2005/0139717 A1 Jun. 30, 2005

(51) Int. Cl.
*B65H 69/02* (2006.01)
(52) U.S. Cl. .................. 242/556.1; 242/555.3
(58) Field of Classification Search .......... 242/555.3, 242/556, 556.1, 555, 555.4, 580, 551; 248/205.3; 428/41.8
See application file for complete search history.

(56) References Cited

U.S. PATENT DOCUMENTS

| | | | |
|---|---|---|---|
| 3,424,644 A | * 1/1969 | Nakagome | 428/42.2 |
| 3,475,263 A | * 10/1969 | Kapilow et al. | 428/42.2 |
| 3,915,399 A | * 10/1975 | Kron et al. | 242/555.6 |
| 4,024,782 A | * 5/1977 | Kron et al. | 83/373 |
| 5,506,015 A | * 4/1996 | Frederiksen et al. | 428/41.8 |
| 5,901,919 A | * 5/1999 | Wienberg | 242/556.1 |

FOREIGN PATENT DOCUMENTS

| | | |
|---|---|---|
| DE | 196 28 317 A1 | 1/1998 |
| DE | 196 32 689 A1 | 2/1998 |
| DE | 198 30 673 A1 | 1/2000 |
| DE | 198 30 674 A1 | 1/2000 |
| DE | 198 41 609 A1 | 3/2000 |
| DE | 199 02 179 A1 | 8/2000 |
| EP | 0 970 905 A1 | 1/2000 |

OTHER PUBLICATIONS

International Search Report, May 29, 2002.

* cited by examiner

*Primary Examiner*—Patrick Mackey
*Assistant Examiner*—William E. Dondero
(74) *Attorney, Agent, or Firm*—Norris Mclaughlin & Marcus PA (57) ABSTRACT

The invention concerns a cover strip for at least partially covering an adhesive tape in the contact area with a drive belt for automatic reel change, comprising two longitudinal edges, a front side and a rear side, characterized in that positioning aids are placed on at least one of the longitudinal edges of the cover strip. Said positioning aids are used to position the cover strip at a defined distance from the edge of the adhesive tape.

17 Claims, 7 Drawing Sheets

COVER STRIP

This application is a 371 of PCT/EP01/10822, filed Sep. 19, 2001.

The invention relates to a cover strip for at least partly covering an adhesive tape for flying splice in the area of contact with a drive belt.

For flying splice on belt-driven roll changes a variety of different bonding patterns are known. The bonds are executed using fixing tabs and double-sided adhesive tape in a V or W profile or else as a straight line. Additionally, as of recently, tapes referred to as integrated adhesive tapes have been used for flying splice, and fulfill all three basic functions for flying splice:

1. fixing of the upper web to the new roll of base material
2. contacting of the outgoing web with the new roll of base material
3. operationally reliable opening of the new roll of base material.

The nonadhesive covering of otherwise exposed adhesive areas is shown by, for example, DE 196 32 689 A2, which discloses an adhesive tape for dynamic loading during the splicing process, the paper carrier of which tape cleaves and, with its remnants, covers the adhesives. Also of this kind is an adhesive tape in accordance with DE 199 02 179 A1, which on its nonadhesive reverse has a double-sided adhesive tape with a cleavable paper carrier.

In all processes, the double-sided adhesive tape or integrated adhesive tape for flying splice can be left out in the area of contact of the belt with the roll of base material or else can be covered there with a suitable cover strip/tab. For covering in this context the use is known of release paper tape and also of single-sided adhesive tape, which are applied flush with the leading edge of the adhesive tape in the area of contact of the drive belt.

In order to produce a bond between the old web and the new web in the belt contact area, the aforementioned cover strips are applied at a distance (X) behind the leading edge of the adhesive tape. In order to reinforce further the belt contact area, use is likewise made of cover strip with circular punched perforations.

The methods referred to above have the drawback of considerable possibilities for error: in the case of manual application, absent any positioning aid, it is difficult to maintain the distance of the cover strip from the leading edge of the adhesive tape. If the distance of the cover strip from the edge of the adhesive tape is inadequate, and if the adhesive tape used has circular punched perforations, which afford only a low effective bonding area, one possible result is for the bond to be inadequate in the belt contact area and, during passage through the machine, to open and form an air pocket, causing the two webs to move apart from one another in the position of the drive belt. In this case, one of the two webs may strike machine parts, e.g., finger guard rods, in a narrow gap on the web route, and may tear off. If the distance of the cover strip from the edge of the adhesive tape is too great, the drive belt may stick during acceleration of the roll of base material, with the consequence that the new roll opens prematurely in the course of acceleration. In practice, disadvantages are apparent even with these cover strips, firstly as a result of the fact that a flying splice is not performed but instead ends as a tear, without any apparent reason.

It was an object of the invention, therefore, to provide a cover strip which avoids the disadvantages of the prior art.

This object is achieved by means of a cover strip as presented in claim 1. The subclaims describe improved embodiments of such a cover strip and also a process for performing a flying splice using a cover strip.

Claim 1 accordingly provides a cover strip for at least partly covering an adhesive tape for flying splice in the area of contact of the drive belt, having two longitudinal edges, a face and a reverse, wherein positioning aids are disposed on at least one of the longitudinal edges of the cover strip, these positioning aids allowing the cover strip to be positioned at a defined distance from the edge of the adhesive tape.

In one advantageous embodiment the positioning aids are in the form of teeth, semicircles or part-circles, semiellipses or partial ellipses or the like. However, all forms which allow a defined distance from the edge of the adhesive tape to be established are also possible within the sense of the invention. The forms in question may be either regular or irregular. The positioning aids preferably have a height H of from 1 to 7 mm, in particular from 2 to 5 mm, and/or are equidistant from one another. The positioning aids may be disposed in such a way as to follow one another directly, in the form of a sawtooth pattern, for example, or else with defined interstices. It is also possible, however, to realize embodiments of the cover strip in which the positioning aids form an irregular sequence.

Versions of the adhesive tape in which positioning aids of different size, for example, of different height H, are provided may also be advantageous. This makes it possible to apply a cover strip for different purposes at distances which are in each case defined but selectable from the edge of the adhesive tape which is to be covered.

In one particularly advantageous embodiment of the inventive cover strip there are cutouts in the area, in particular in the form of elongate holes, whose longitudinal axis extends perpendicularly or obliquely with respect to the longitudinal direction of the cover strip (and hence also, in general, of the adhesive tape). With great advantage the elongate holes may be present at an angle of up to 45° to the longitudinal direction of the cover strip, especially advantageously at an angle of 30°.

It has been found particularly advantageous for the thickness of the cover strip to be from 20 to 150 μm, in particular from 35 to 130 μm.

One advantageous version of the inventive cover strip has at least one layer of a self-adhesive composition.

Additionally it is advantageous to provide the inventive cover strip with perforations and/or slits which run perpendicularly or obliquely with respect to the longitudinal direction of the cover strip.

The length $L_P$ of the sections of cover strip between two perforation lines or two sections can be selected freely depending on application, and can, for example, be adapted optimally for the width of the drive belts, so that, by separating one part of the cover strip in each case at such a perforation or at such a slit, a cover strip piece is obtained whose length (corresponding to $L_P$) corresponds essentially, for example, to the width of the drive belt (or to the prevailing width of the belt cutout in the flat-web-processing machines, e.g., in printing machines) and can therefore be used outstandingly to cover an adhesive splicing tape on a new roll in the area of the drive belts. The cover strip pieces can, however, also, advantageously, be somewhat larger or somewhat smaller than the width of the belts.

In one particularly preferred embodiment of the cover strip the length $L_P$ is advantageously between 40 and 50 mm, in particular between 40 and 45 mm, and especially 42.5 mm.

By separating not at each successive perforation but rather only at subsequent successive perforations or incisions it is possible to obtain cover strip pieces whose length is a multiple of that of the length $L_P$, thereby allowing cover strip pieces of 85 mm, 127.5 mm, 170 mm, and so on to be produced.

The inventive cover strip may advantageously itself already have a defined length $L_E$, and thus, for example, may be in tab form. In this case the length $L_E$ of the cover strip or cover tab corresponds essentially to the width of the cover belts, but may also be somewhat larger or somewhat smaller than the width of the belts. The length $L_E$ corresponds here preferably to the figures given above for $L_P$.

In one preferred embodiment the cover strip is in the form of a cover of a self-adhesive tape. This is especially the case where such an adhesive tape is presented on a roll or the like: the adhesive tape is preferably of the kind used for the splicing operation for continuous bonding in the case of a flying splice, in the paper-converting industry, for example. This adhesive tape already provides the covering in accordance with the concept of the invention, in the manner presented here, in the form of its release material.

In such an embodiment it is advantageous if the cover strip is provided with a slot in the longitudinal direction, so that the cover strip can be removed from the adhesive tape in two steps independent of one another. The slot is preferably disposed at a distance of from 5 to 40 mm from the longitudinal edge of the adhesive tape which is opposite the longitudinal edge in the vicinity of which the cleavable system is disposed. The cutouts may be limited preferably to only one part of the longitudinally divided cover strip, or else may be provided in both parts of the longitudinally divided cover strip. Similar comments apply to the provision of the positioning aids.

It is particularly advantageous to use an adhesive tape which has at least one main carrier, a self-adhesive composition on the top face of the main carrier, and at least one strip of a self-adhesive cleavable system on the underside. Adhesive tapes of this kind are described in, for example, DE 196 28 317 A1, DE 196 32 689 A1, DE 198 30 673 A1, DE 198 30 674 A1, and DE 199 02 179 A1. It should be noted here, however, that the inventive cover strip can be used in principle for all adhesive tapes which are used in particular for continuous bonding.

It is advantageous to use a cleavable system whose cleavage resistance is much lower than that of a paper carrier, which is required to accommodate tensile forces. Examples of suitable cleavable systems, in particular cleavable papers, include the following papers or paper composite systems:

Duplex papers (papers laminated together in a defined way; the cleaving process is extremely homogeneous, with no peaks in tension as a result, for example, of inhomogeneous consolidation. These papers are used for producing wall coverings and filters.

Easily cleavable paper systems, e.g., papers lacking wet strength

Highly compacted papers glued together in a defined way (⇒ paper having a high cleavage resistance). Gluing can be carried out, for example, with starch, derivatives containing starch, methylcellulose-based wallpaper pastes (Methylan®, Henkel KGaA, Dusseldorf) or else those based on polyvinyl alcohol derivatives.

A cleaving system in accordance with DE 198 41 609 A1 can also be employed. In this case the cleavage forces are determined by the size of the bonding points.

It is very advantageous to use cleavable systems which have cleavage forces of from 15 to 40 cN/cm, preferably from 15 to 35 cN/cm, very preferably from 17 to 25 cN/cm.

The invention further provides a splicing process for flying splice of flat web material wound up into rolls, in which the topmost paper web of a new roll is fixed to the underlying web with an adhesive tape which is provided with at least one main carrier, at least one layer of a self-adhesive composition on the top face, and at least one self-adhesive cleavable system on the underside, and a portion of the self-adhesive composition which is required for the splicing process is exposed, whereupon the new roll thus equipped is placed alongside an old, almost fully unwound roll which requires replacement and is accelerated to essentially the same rotational speed as said old roll by means of drive belts, with at least the major part of the areas of the adhesive tape which are in the area of contact with the drive belts being covered by a cover strip, the cover strip being positioned with the aid of positioning aids on the cover strip, after which the new roll is pressed against the old web, with the exposed self-adhesive composition of the adhesive tape bonding to the old web while the webs are at substantially the same speeds, while at the same time the cleavable system cleaves in such a way that, after the cleaving operation, there are no exposed adhesive areas.

With great preference, the covering of the areas of the adhesive tape in the area of contact with the belts is such that from 1 to 7 mm of adhesive remain exposed at the leading edge.

For a splicing process of this kind the cover strip used is with particular preference a cover strip as described above, it being possible to use any embodiment of the inventive cover strip.

In one advantageous development of the inventive process the adhesive splicing tape is bonded at right angles to the running paper web, in other words transversely across the new roll, or else at an acute angle of up to 300, in particular up to 100, with respect to the transverse direction.

With the use of the inventive cover strip and/or with the inventive process there is no longer any need for an interruption to the adhesive bonding of the adhesive tape on the new roll in the area of the drive belts. The cover strip is applied to the cover strip in such a way that the positioning aids finish flush with the leading longitudinal edge of the adhesive splicing tape, so that a defined area of the adhesive tape is exposed at the leading longitudinal edge.

The width of the defined area (the area which remains adhesive) corresponds to the height of the positioning aids.

Sticking of the belts is prevented by the covering of the exposed adhesive with the cover strip. As a result the adhesive strip can be bonded across the full width of the roll of the flat web material, without any need for interruptions in the area of the belts. This considerably improves the splicing operation as compared with the conventional procedures, especially when elongate holes are made in the cover strip.

The belt areas, i.e., the areas of the adhesive tape over which the drive belts run, are covered with the cover strip in the manner depicted. In the case of narrow belts situated close to one another it is also possible for two adjacent belt areas to be covered with a single cover-strip section.

Tests have shown that the reliability of splicing is significantly increased by the invention. The occurrence of tearing is observed only to a greatly reduced extent.

Moreover, when an adhesive splicing tape in which the cleavable system has very low cleavage forces is used, the efficiency in the case of roll changeover with low speeds (zero speed splice) is distinctly increased. At low speeds in particular the impulse which assists the cleaving of the cleavable system is absent.

BRIEF DESCRIPTION OF THE DRAWINGS

In the text below the invention will be described in more detail with reference to an example, though without wishing thereby to restrict it unnecessarily.

The drawings, accordingly, show a diagrammatic representation of a cover strip of the invention and its use, and are therefore intended to elucidate the invention by way of example.

Figure 1:
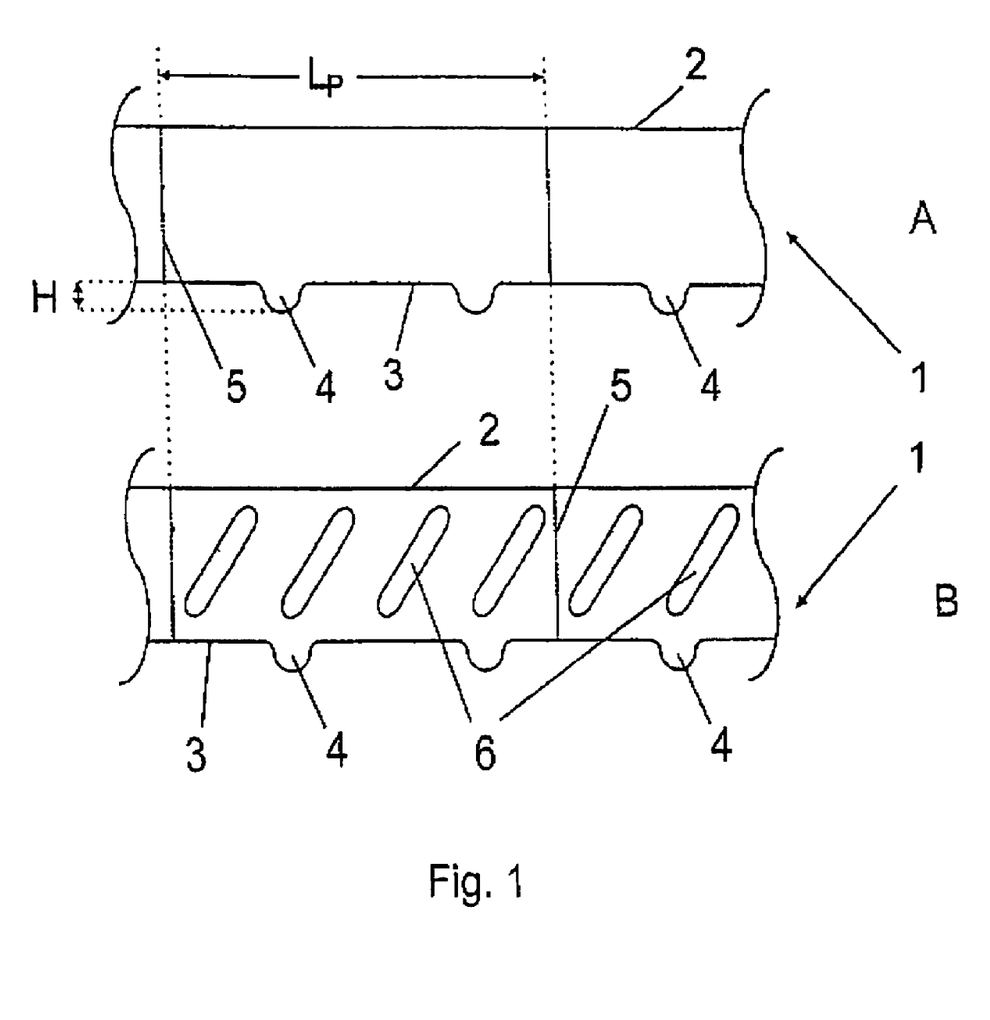
Figure 2:
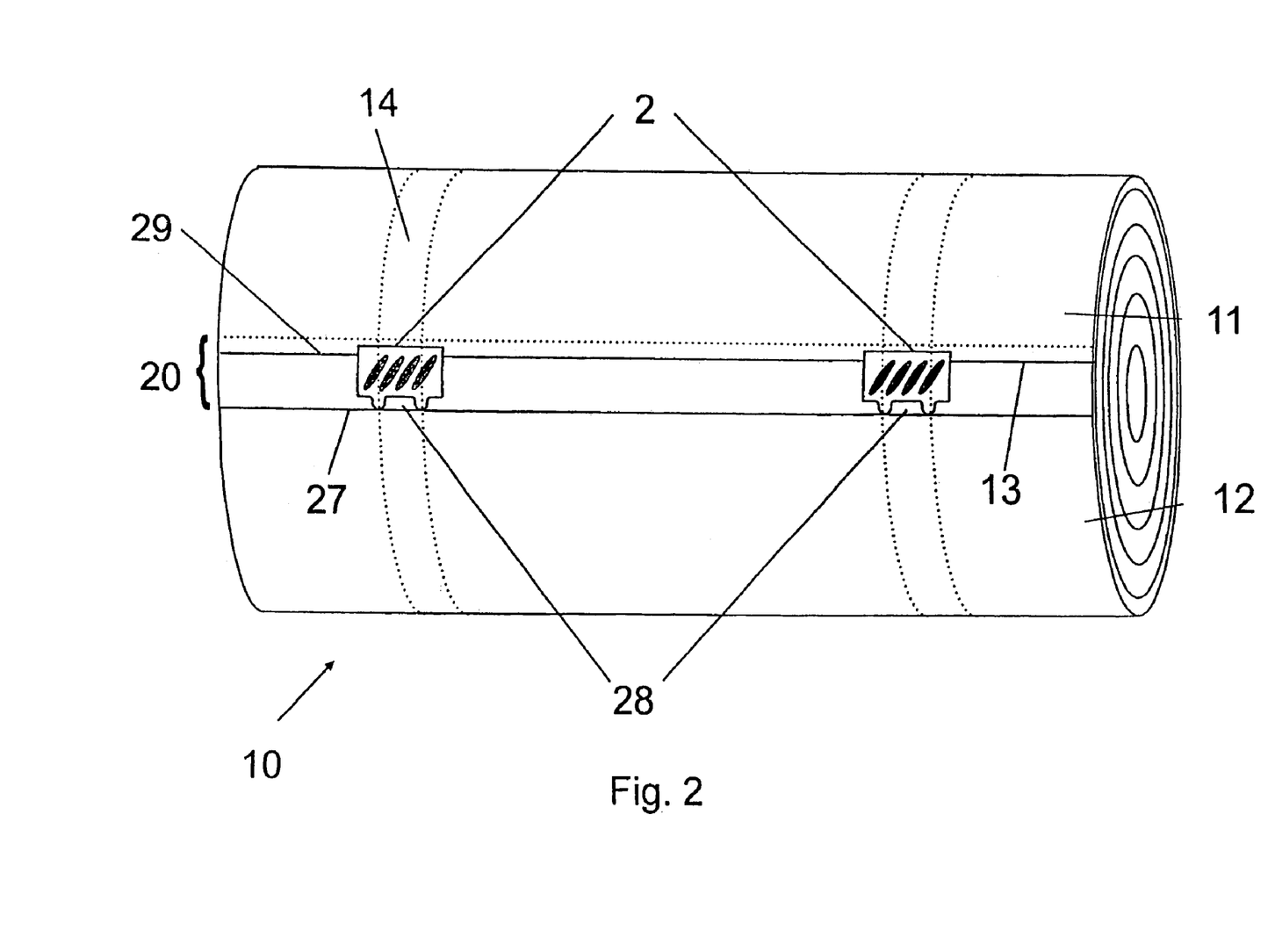
Figure 3:
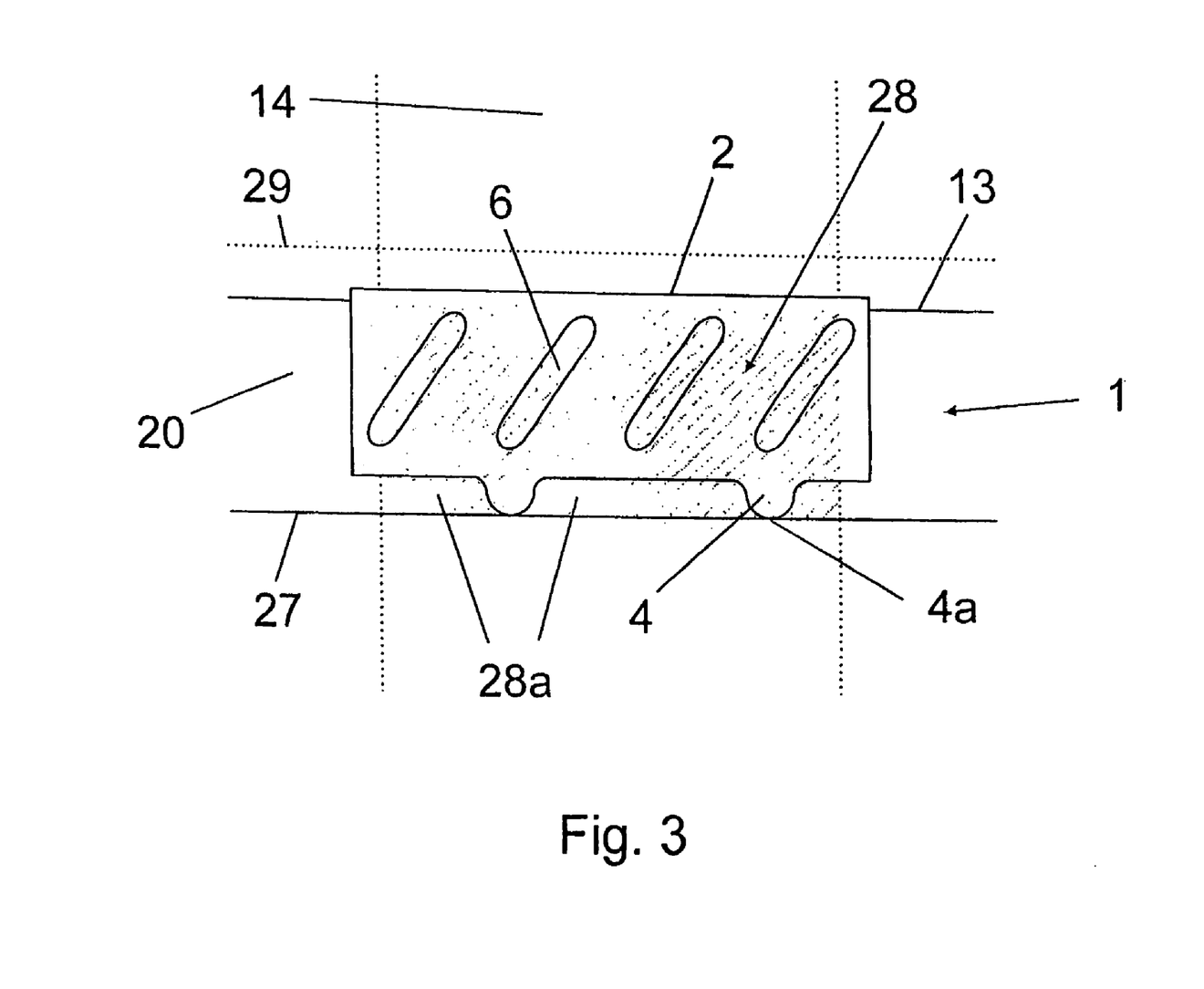
Figure 4:
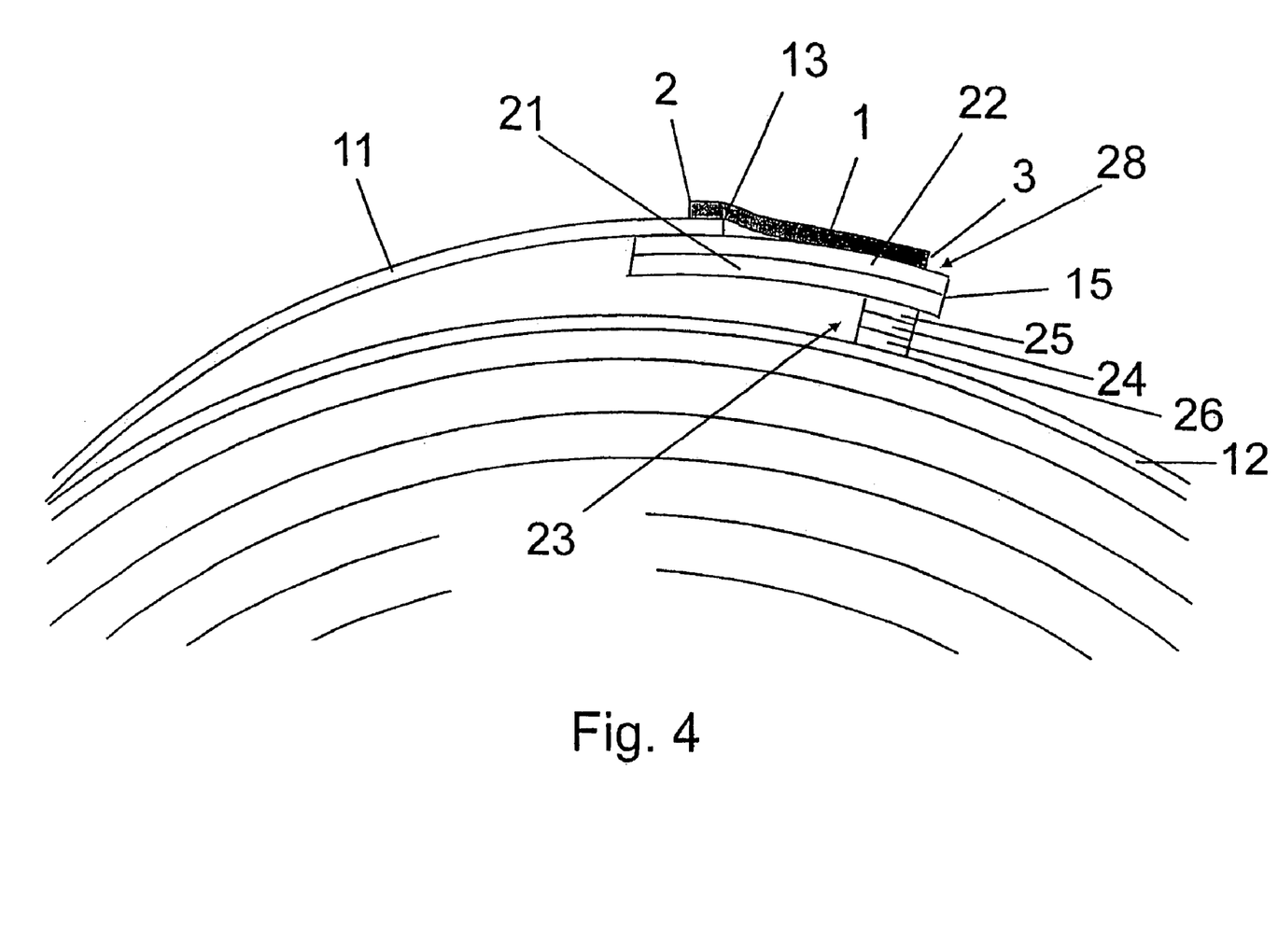
Figure 5:
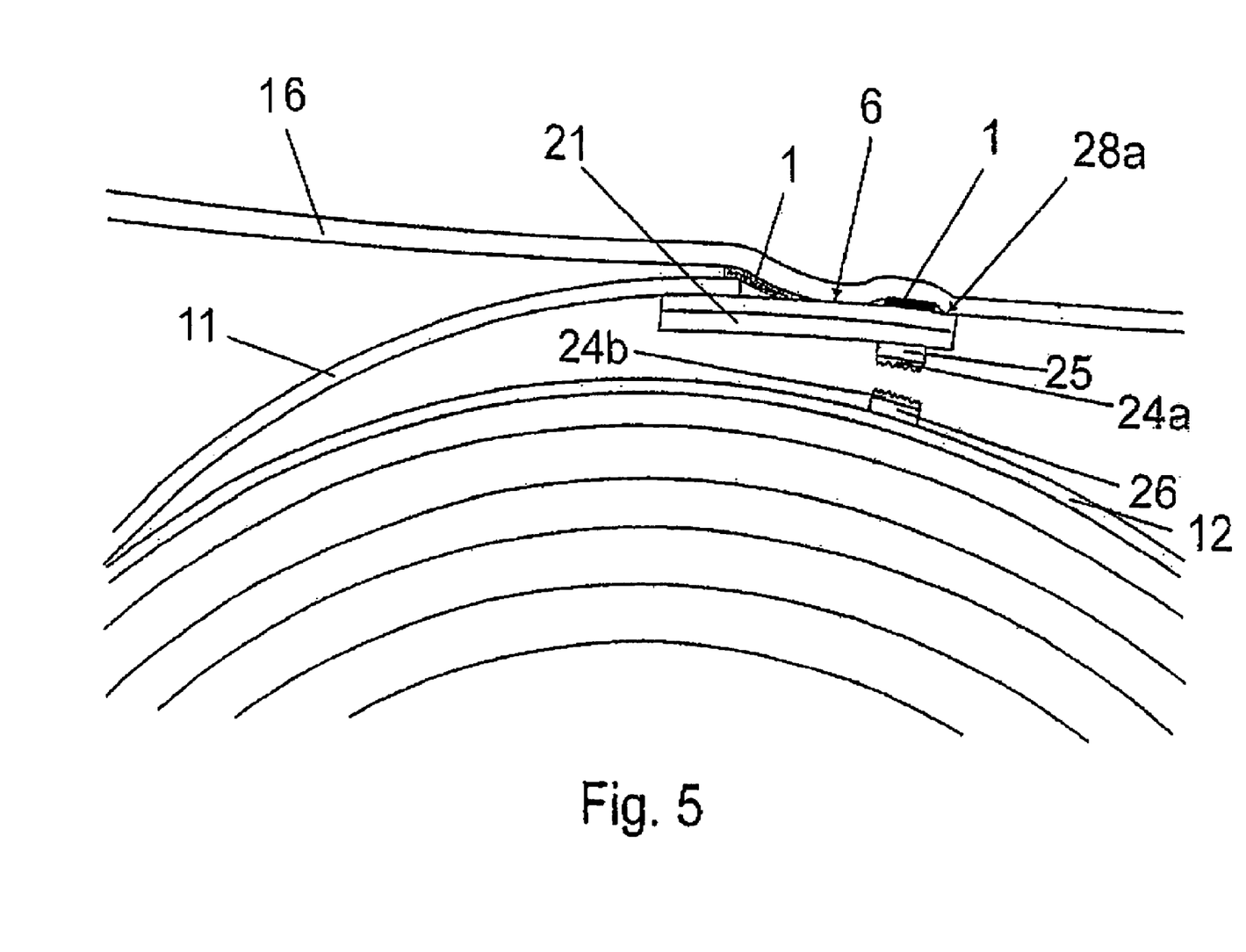
Figure 6:
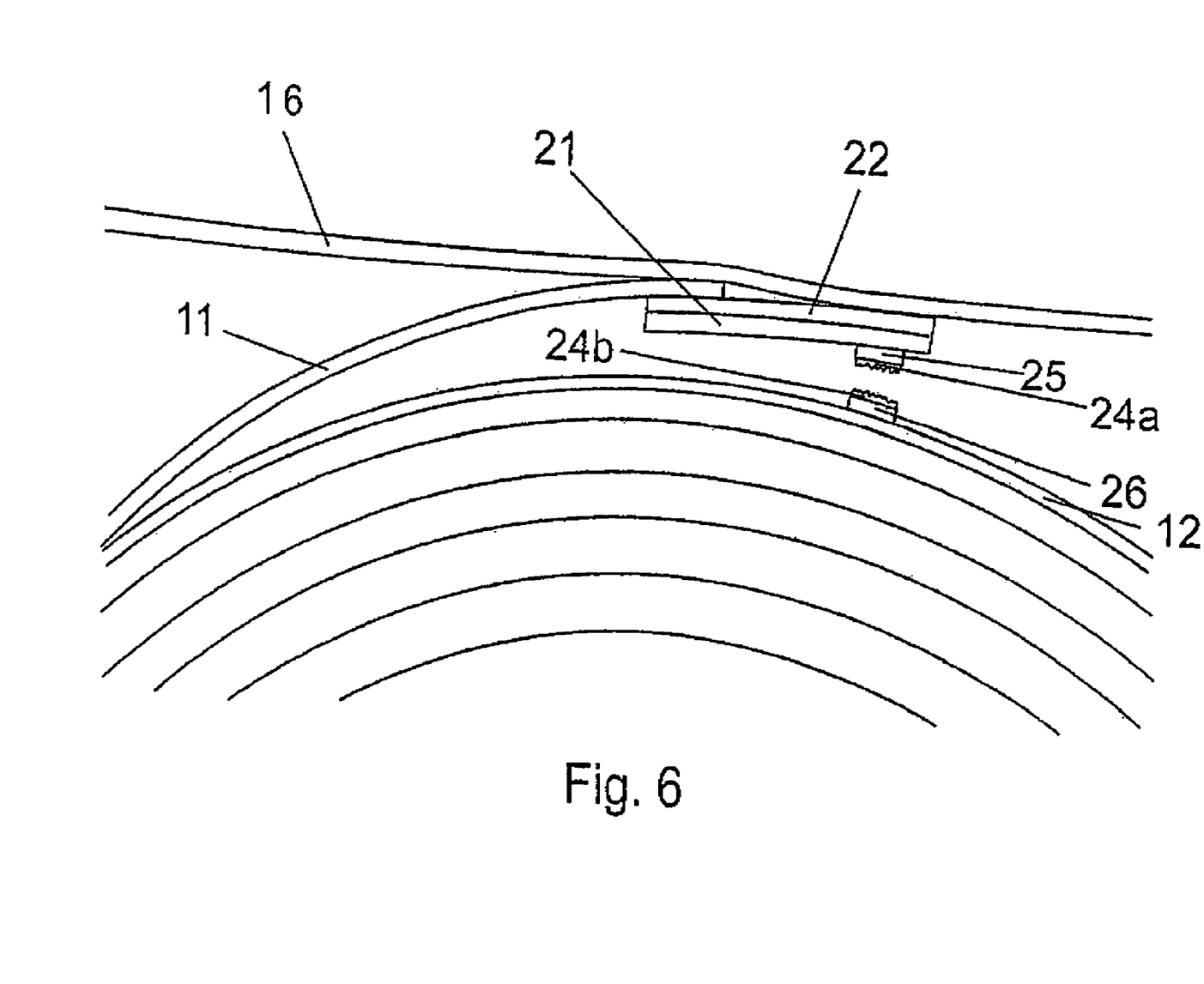
Figure 7:
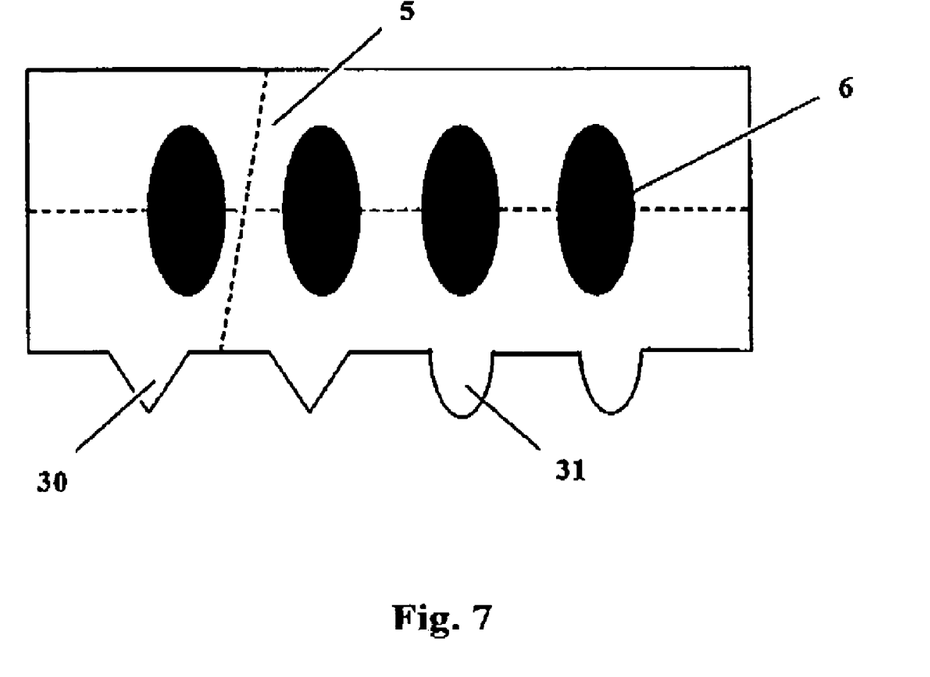

FIG. 1A shows a diagrammatic plan view of an inventive cover strip without elongate holes FIG. 1B shows a diagrammatic plan view of an inventive cover strip with elongate holes FIG. 2 shows a diagrammatic view of a roll equipped for flying splice, provided with an adhesive tape for the splice and with an inventive cover strip for covering in the area of contact with the drive belts FIG. 3 shows a magnified detail from FIG. 2 in the area of contact with the drive belts FIG. 4 shows a diagrammatic side view of the adhesive tape of FIG. 2, adhered to a roll of paper in the area of contact with the drive belts, and ready for flying splice FIG. 5 shows a diagrammatic side view as in FIG. 3, but after flying splice has taken place FIG. 6 shows a side view as in FIG. 4, but in the area which does not come into contact with the drive belts FIG. 7 shows a plan view of an alternate cover strip embodiment of the present invention, wherein the cover strip comprises teeth ( ) and semi-elliptical positioning aids, elongated apertures (6) perpendicular to the longitudinal axis of the cover strip, and perforation or slit (5) extending obliquely with respect to the longitudinal axis Specifically, FIG. 1A shows a cover strip consisting of two longitudinal edges, 2 and 3, having positioning aids 4 punched out at regular intervals, with a preferred height H of 1 to 7 mm, along the longitudinal edge 3. Further provided at regular intervals $L_P$ are perforations 5 in the transverse direction, in order to allow defined lengths of the adhesive tape to be separated off. Separation lengths which are particularly advantageous from a technical standpoint are:

42.5 mm for MegTec roll changes
85 mm for WIFAG/GOSS roll changes
127.5 mm for KBA roll changes (gravure)
170 mm for MAN Roland, KBA (offset), Cerutti (gravure) roll changes;

these figures correspond to the widths given by the respective machine manufacturers for the belt cutout in the case of a conventional procedure without cover strips.

FIG. 1B shows a cover strip of the same kind but with elongate holes 6 punched out. The elongate holes 6 can be punched transversely to the running direction or else may extend obliquely to the running direction; in the embodiment depicted here, a diagonal extent is provided.

FIG. 2 shows a diagrammatic view of a new roll 10 of paper, in the case of which the topmost paper web 11 is fixed using a double-sided or integrated adhesive tape 20 to the underlying paper web 12 for flying splice. The adhesive tape 20 in this case runs over the entire width of the new roll 10. Discernible in FIG. 2 are the leading edge 15 of the adhesive tape 20, the leading edge 13 of the topmost paper web 11, and the rear edge 29 of the adhesive tape 20, which lies beneath the topmost paper web 11. In the drawing, those areas of the roll 10 which are in contact with the drive belts are shown as an area 14 delimited by broken lines.

An enlarged extract of FIG. 2 in the area 28 of contact of the adhesive tape 20 with the drive belts is shown in FIG. 3: the areas 28 (shaded area) are covered with a section of the cover strip 1. The positioning aids 4 serve for the precise positioning of the cover strip 1 on the adhesive tape 20 for flying splice, by virtue of the fact that the front areas 4a of the positioning aids are positioned exactly at the longitudinal edge 27 of the adhesive tape 20. The areas of the adhesive tape 20 that lie within the area of the elongate holes 6 remain exposed and remain adhesive, as does the region 28a of the area 28 on adhesive tape 20 that is situated before the cover strip 1.

FIG. 4 shows a side view of a new roll 10, equipped as depicted in FIG. 2 for flying splice, in the area of the cover strip 1. A depiction is given of how an adhesive tape 20 is adhered behind the topmost paper web 11, specifically by its left-band portion, in order to prepare for flying splice. The area 28 of the adhesive tape 20 which is in the area of contact with the drive belts have been covered by the cover strip in such a way that there can be no contact between the adhesive tape 20 and the drive belts. In order to achieve even greater splicing reliability the cover strip 1 is placed at a defined distance behind the leading edge 27 of the adhesive tape by means of positioning aids 4, not shown in FIG. 4, so that a continuous (with the exception of positioning aids) adhesive area 28a remains.

The adhesive tape 20 has a carrier 21 made of low-crepe paper, which is coated on one side with a water-soluble self-adhesive composition 22. The total thickness of the carrier 21 with self-adhesive composition 22 is 0.088 mm, its width 150 mm. Adhered beneath at the right-hand end of the adhesive tape 20 is a strip of a double-sided adhesive tape 23, composed of a cleavable paper carrier 24 coated on either side with water-soluble self-adhesive composition 25 and 26 respectively.

The roll 10 of paper thus equipped is ready for flying splice. The self-adhesive composition 22 is exposed outside the areas covered with the cover strip 1 and constitutes the contact area with the outgoing web for the flying splice. Outside the areas covered with the cover strip 1 the contact area has a width of 120 mm and extends essentially over the entire roll of paper.

The (new) roll 10 of paper thus equipped is brought alongside the almost fully unwound (old) roll of paper to which the new roll is to be attached. The new roll 10 of paper is accelerated to a rotational speed which is close to the speed of the outgoing web. When the two speeds have been sufficiently synchronized the changeover can be performed: by means of a contact shaft, the outgoing web 16 is brought into contact wit the periphery of the new web 11, and the self-adhesive composition 22 bonds to the outgoing web 16 in accordance with FIG. 5. In the area of the cover strip 1 a sufficient adhesive bond is ensured by contact of the old paper web 16 with the adhesive 22 in the region of the elongate holes 6 and of the region 28a.

In the moment after adhesive contact the cleavable paper carrier 24 cleaves in such a way that one part 24a remains on the adhesive tape 20, where it covers the self-adhesive composition 25, while the other part, 24b, remains on the self-adhesive composition 26, which adheres on the paper web 12. Thus both self-adhesive compositions 25 and 26 are neutralized, so to speak, no longer adhere, and hence also no longer interfere with further operation in the paper-converting machines.

FIG. 6 shows the same situation as in FIG. 5 but in an area which lies outside the area 14 of contact with the drive belts.

The invention claimed is:

1. A cover strip for at least partly covering an adhesive tape for a flying splice in an area of contact with a drive belt, said cover strip comprising two longitudinal edges, a face side, and a reverse side, wherein positioning aids are disposed on at least one of the longitudinal edges of the cover strip, and whereby said positioning aids allow the cover strip to be positioned at a defined distance from an edge of the adhesive tape said positioning aids protruding from said at least one of the longitudinal edges.

2. The cover strip according to claim 1, wherein said positioning aids are in the form of teeth, semicircles, semi-ellipses or a combination thereof.

3. The cover strip according to claim 1, wherein said positioning aids have a height of from 1 to 7 mm.

4. The cover strip according to claim 1, wherein said positioning aids have a height of from 2 to 5 mm.

5. The cover strip according to claim 1, wherein said positioning aids are equidistant from one another.

6. The cover strip according to claim 1, wherein cutouts in a surface of the cover strip form elongated apertures, each of said aperatures comprising a longitudinal axis extending perpendicular to a longitudinal direction of the cover strip.

7. The cover strip according to claim 6, wherein the cutouts in the surface of the cover strip form elongated apertures, each of said aperatures comprising a longitudinal axis extending at an angle of up to 45° with respect to the longitudinal direction of the cover strip.

8. The cover strip according to claim 1, wherein the cover strip is from 20 to 120 μm in thickness.

9. The cover strip according to claim 1, wherein the cover strip is from 35 to 100 μm in thickness.

10. The cover strip according to claim 1, wherein said cover strip comprises at least one layer of a self-adhesive composition.

11. The cover strip according to claim 1, comprising perforations, slits or a combination thereof which extend perpendicularly to a longitudinal direction of the cover strip.

12. The cover strip according to claim 1, comprising perforations, slits or a combination thereof which extend obliquely with respect to a longitudinal direction of the cover strip.

13. The cover strip according to claim 1, wherein the cover strip is from 15 to 40 mm in length.

14. The cover strip according to claim 1, wherein the cover strip is from 15 to 35 mm in length.

15. The cover strip according to claim 1, wherein the cover strip is from 17 to 25 mm in length.

16. A combination comprising a self-adhesive tape and a cover strip according to claim 1 covering said self-adhesive tape.

17. A method for a flying splice of flat web material wound up into rolls, said method comprising:
 a) fixing a topmost paper web of a new roll to an underlying web with an adhesive tape comprising at least one main carrier, at least one layer of a self-adhesive composition on a top face, and at least one self-adhesive cleavable system on an underside;
 b) exposing a portion of the self-adhesive composition required for the splicing;
 c) placing the new roll beside an old roll which is unwinding and is to be replaced;
 d) accelerating said new reel to substantially a same rotational speed as said old reel by means of one or more drive belts, wherein at least a major part of the areas of the adhesive tape in contact with said one or more drive belts are covered by a cover strip according to claim 1;
 e) positioning the cover strip with the positioning aids on the cover strip;
 f) pressing the new roll against the old web wherein the exposed self-adhesive composition of the adhesive tape bonds to the old web while the webs are at substantially the same speeds;
 g) cleaving the cleavable system, wherein after the cleaving, there are no exposed adhesive areas.

* * * * *